United States Patent
Meylan (10) Patent No.: US 8,665,857 B2
(45) Date of Patent: Mar. 4, 2014

(54) METHOD AND APPARATUS FOR SENDING AND RECEIVING RANDOM ACCESS RESPONSE IN A WIRELESS COMMUNICATION SYSTEM

(75) Inventor: Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 12/243,151

(22) Filed: Oct. 1, 2008

(65) Prior Publication Data

US 2009/0156194 A1 Jun. 18, 2009

Related U.S. Application Data

(60) Provisional application No. 61/014,649, filed on Dec. 18, 2007.

(51) Int. Cl.
- *H04J 3/24* (2006.01)
- *H04L 12/28* (2006.01)
- *H04W 72/00* (2009.01)

(52) U.S. Cl.
USPC .............................. 370/349; 370/431; 455/450

(58) Field of Classification Search
None
See application file for complete search history.

(56) References Cited

U.S. PATENT DOCUMENTS

| | | | |
|---|---|---|---|
| 6,950,399 B1 | 9/2005 | Bushmitch et al. | |
| 7,321,589 B2 | 1/2008 | Lohr et al. | |
| 7,426,394 B2 | 9/2008 | Rinne | |
| 7,436,795 B2 | 10/2008 | Jiang | |
| 7,693,156 B2 | 4/2010 | Liljestrom et al. | |
| 7,848,308 B2 * | 12/2010 | Lee et al. | 370/350 |
| 7,899,075 B2 | 3/2011 | Whitehead et al. | |
| 7,961,680 B2 | 6/2011 | Park et al. | |
| 8,081,606 B2 | 12/2011 | Cai et al. | |
| 2002/0091831 A1 | 7/2002 | Johnson | |

(Continued)

FOREIGN PATENT DOCUMENTS

| | | |
|---|---|---|
| CN | 1878052 A | 12/2006 |
| EP | 1009184 A2 | 6/2000 |

(Continued)

OTHER PUBLICATIONS

Park et al., Provisional U.S. Appl. No. 60/945,090, filed Jun. 19, 2007, pp. 1-3, "Method Related to Controlling Wireless Resources and Transmitting Data in a Wireless Communication System".*

(Continued)

*Primary Examiner* — Gregory Sefcheck
(74) *Attorney, Agent, or Firm* — Liem T. Do (57) ABSTRACT

Techniques for supporting random access by user equipments (UEs) in a wireless communication system are described. In one design, a UE transmits a random access (RA) preamble for random access. The UE thereafter receives a random access response composed of a first part and a second part. The first part includes a list of N RA preamble IDs for N RA preambles being responded to by the random access response, where N≥1. The second part includes N individual RA responses for the N RA preambles being responded to. The UE processes the first part to detect for an RA preamble ID of the RA preamble transmitted by the UE. If this RA preamble ID is not detected, then the UE skips the second part. Otherwise, the UE processes the second part to obtain an individual RA response for the transmitted RA preamble.

31 Claims, 8 Drawing Sheets

(56) References Cited

U.S. PATENT DOCUMENTS

| | | |
|---|---|---|
| 2005/0135318 A1 | 6/2005 | Walton et al. |
| 2005/0186959 A1 | 8/2005 | Vialen et al. |
| 2007/0093209 A1 | 4/2007 | Agrawal et al. |
| 2007/0133458 A1 | 6/2007 | Chandra et al. |
| 2007/0206531 A1* | 9/2007 | Pajukoski et al. ............ 370/329 |
| 2007/0245202 A1 | 10/2007 | Kim et al. |
| 2007/0258540 A1 | 11/2007 | Ratasuk et al. |
| 2008/0049851 A1 | 2/2008 | Nangia et al. |
| 2008/0130588 A1* | 6/2008 | Jeong et al. ............... 370/335 |
| 2008/0228878 A1 | 9/2008 | Wu et al. |
| 2008/0232283 A1* | 9/2008 | Jen ............................. 370/310 |
| 2008/0232317 A1* | 9/2008 | Jen ............................. 370/329 |
| 2008/0232329 A1* | 9/2008 | Jen ............................. 370/335 |
| 2008/0233940 A1* | 9/2008 | Jen ............................. 455/418 |
| 2008/0233941 A1* | 9/2008 | Jen ............................. 455/418 |
| 2008/0233964 A1 | 9/2008 | McCoy et al. |
| 2008/0235314 A1 | 9/2008 | Lee et al. |
| 2008/0273610 A1* | 11/2008 | Malladi et al. ............... 375/260 |
| 2009/0003274 A1 | 1/2009 | Kwak et al. |
| 2009/0041240 A1* | 2/2009 | Parkvall et al. ............. 380/247 |
| 2009/0141661 A1 | 6/2009 | Li et al. |
| 2009/0175253 A1* | 7/2009 | Wu et al. ..................... 370/338 |
| 2009/0201868 A1 | 8/2009 | Chun et al. |
| 2009/0201891 A1* | 8/2009 | Lee et al. ..................... 370/336 |
| 2009/0203377 A1 | 8/2009 | Kawasaki |
| 2009/0252093 A1 | 10/2009 | Frenger |
| 2009/0259910 A1 | 10/2009 | Lee et al. |
| 2009/0290549 A1 | 11/2009 | Tiirola et al. |
| 2009/0323607 A1* | 12/2009 | Park et al. .................... 370/329 |
| 2010/0008242 A1 | 1/2010 | Schein |
| 2010/0034162 A1 | 2/2010 | Ou et al. |
| 2010/0037113 A1 | 2/2010 | Maheshwari et al. |
| 2010/0040001 A1 | 2/2010 | Montojo et al. |
| 2010/0074204 A1 | 3/2010 | Meylan |
| 2010/0085927 A1 | 4/2010 | Torsner et al. |
| 2010/0093386 A1* | 4/2010 | Damnjanovic et al. ....... 455/522 |
| 2010/0128648 A1* | 5/2010 | Lee et al. ..................... 370/312 |
| 2010/0135229 A1 | 6/2010 | Lohr et al. |
| 2010/0142470 A1* | 6/2010 | Park et al. .................... 370/329 |
| 2010/0197315 A1 | 8/2010 | Lindstrom et al. |
| 2010/0272035 A1* | 10/2010 | Park et al. .................... 370/329 |
| 2010/0309877 A1* | 12/2010 | Damnjanovic et al. ....... 370/331 |
| 2010/0323736 A1* | 12/2010 | Fischer et al. ................ 455/509 |
| 2010/0331003 A1* | 12/2010 | Park et al. .................... 455/450 |
| 2011/0032891 A1* | 2/2011 | Lee et al. ..................... 370/329 |
| 2011/0170503 A1* | 7/2011 | Chun et al. .................. 370/329 |
| 2011/0182245 A1 | 7/2011 | Malkamaki et al. |
| 2013/0163549 A1 | 6/2013 | Montojo et al. |

FOREIGN PATENT DOCUMENTS

| | | |
|---|---|---|
| EP | 1784036 A1 | 5/2007 |
| JP | 2009535966 A | 10/2009 |
| RU | 2280929 C1 | 7/2006 |
| RU | 2304348 C2 | 8/2007 |
| RU | 2313197 C2 | 12/2007 |
| TW | I362850 B | 4/2012 |
| WO | WO 2004064272 A1 | 7/2004 |
| WO | WO2006099225 A1 | 9/2006 |
| WO | WO2007011180 A1 | 1/2007 |
| WO | WO2007052972 A1 | 5/2007 |
| WO | WO2007091831 | 8/2007 |
| WO | 2007116985 A1 | 10/2007 |
| WO | WO2007119542 A1 | 10/2007 |
| WO | WO 2007126302 A1 | 11/2007 |
| WO | WO2008041936 A1 | 4/2008 |
| WO | WO2008042889 | 4/2008 |
| WO | WO2008050428 A1 | 5/2008 |
| WO | WO2008055235 | 5/2008 |
| WO | 2008085959 A1 | 7/2008 |

OTHER PUBLICATIONS

Park et al., Provisional U.S. Appl. No. 60/983,563, filed Oct. 29, 2007, pp. 1-13, "Handling of HFN Desynchronization".*

Ericsson, Format of Random Access Response, 3GPP TSG-RAN WG2 #60, Tdoc R2-074938, Jeju, Korea: Nov. 5-9, 2007.

International Search Report and Written Opinion—PCT/US2008/087083, International Search Authority—European Patent Office—Apr. 29, 2009.

Motorola: "LTE Random Access Procedure", 3GPP TSG-RAN WG2#53, [On line] vol. R2-061463, May 8-12, 2006, p. 1-4 XP007905045 Shanghai, China URL:http://www.3gpp.org/ftp/tsg_ran/WG2_RL2/TSGR2_53/Documents/>.

3GPP: "3GPP TS 36.321 V8.2.0 (May 2008); 3rd Generation Partnership Project; Technical Specification Group Radio Access Network; Evolved Universal Terrestrial Radio Access (E-UTRA) Medium Access Control (MAC) protocol specification (Release 8)" 3rd Generation Partnership Project (3GPP); Technicalspecification (TS), XX, XX, No. TS 36.321 V8.2.0, May 1, 2008, pp. 1-33, XP002554062.

3GPP: "Technical Specification Group Radio Access Network; Evolved Universal Terrestrial Radio Access (E-UTRA) Medi urn Access Control (MAC) protocol specification (Re1 ease 8)" Internet Citation, [Online] pp. 13-20, XP002539526 Retrieved from the Internet: URL: http://www.3gpp.org/ftp/Specs/archive/36-series/36.321/> [retrieved on Aug. 31, 2009] p. 16, paragraph 5.3.1 p. 17, paragraph 5.3.2.2.

Amitava Ghosh et al: "Random Access Design for UMTS Air-Interface Evolution" Vehicular Technology Conference, 2007. VTC2007-Spring. IEEE 65th, IEEE, PI , Apr. 1, 2007, pp. 1041-1045, XP031092788 ISBN: 978-1-4244-0266-3.

Ericsson, "LTE PDCP Header Content", TSG-RAN WG2 Meeting #59bis, R2-074477, Shanghai, China, Oct. 8-12, 2007.

Huawei: "HARQ process Id of DL persistent scheduling" 3GPP Draft; R2-083518, 3rd Generation Partnership Project (3GPP), Mobile Competence Centre ; 650, Route Des Lucioles ; F-06921 Sophia-Antipolis Cedex ; France, vol. RAN WG2, No. Warsaw, Poland; Jun. 24, 2008, XP050140894 [retrieved on Jun. 24, 2008].

LG Electronics Inc: "Handling of Received UL Grant in RA procedure" Aug. 12, 2008, 3GPP Draft; R2-084388 CR on Handling of Received UL Grant in RA PrOcedure_R1, 3rd Generation Partnership Project (3GPP), Mobile Competence Centre ; 650, Route Des Lucioles ; F-06921 Sophia-Antipolis Cedex ; France , XP050319458 [retrieved on Aug. 12, 2008].

LG Electronics Inc: "Handling of Received UL Grant in RA procedure" 3GPP Draft; R2-084387 Handling of Received UL Grant in RA PrOcedure_R1, 3rd Generation Partnership Project (3GPP), Mobile Competence Centre ; 650, Route Des Lucioles ; F-06921 Sophia-Antipolis Cedex ; France, No. Jeju; Aug. 12, 2008, XP050319457.

LG Electronics Inc: "Re-Transmission of Persistent Scheduling" 3GPP Draft; R2-082260 Retransmission of Persistent Scheduling, 3rd Generation Partnership Project (3GPP), Mobile Competence Centre ; 650, Route Des Lucioles ; F-06921 Sophia-Antipolis Cedex ; France, vol. RAN WG2, No. Kansas City, USA; Apr. 9, 2008, XP050140021 [retrieved on Apr. 29, 2008].

Qualcomm Europe et al: "Handling of Uplink Grant in Random Access Response" 3GPP Draft; R1-083439, 3rd Generation Partnership Project (3GPP), Mobile Competence Centre ; 650, Route Des Lucioles ; F-06921 Sophia-Antipolis Cedex ; France, No. Jeju; Sep. 5, 2008, XP050316800.

Qualcomm Europe, "PRACH and Message3 power control", 3GPP TSG-RAN WG1 #53bis, R1-082551, Jun. 30-Jul. 4, 2008, Warsaw, Poland.

Qualcomm Europe: "Handling of Uplink Grant in Random Access Response" 3GPP Draft; R1-083186, 3rd Generation Partnership Project (3GPP), Mobile Competence Centre ; 650, Route Des Lucioles ; F-06921 Sophia-Antipolis Cedex ; France, No. Jeju; Aug. 13, 2008, XP050316617.

Qualcomm Europe: "NDI and Message 3" 3GPP Draft; R2-084156 NDI and MSG3, 3rd Generation Partnership Project (3GPP), Mobile Competence Centre ; 650, Route Des Lucioles ; F-06921 Sophia-Antipolis Cedex ; France, No. Jeju; Aug. 12, 2008, XP050319292.

RAN1, "Reply to RAN2 LS on RACH Power Control Optimisation Use case", 3GPP TSG RAN WG2 Meeting #61 R2-080652, Sorrento, Italy, Feb. 11-15, 2008.

(56) References Cited

OTHER PUBLICATIONS

TSG RAN WG 2, "Uplink grant format in Random Access Response" 3GPP TSG-RAN WG2 Meeting #62bis, R2-083779, Jun. 30-Jul. 4, 2008, Warsaw Poland.

TSG-RAN WG1, "LS reply on PDCCH for DL data arrival and random access response format", 3GPP TSG RAN WG2 Meeting #62bis, R2-083061, Warsaw, Poland, Jun. 30-Jul. 4, 2008.

Universal Mobile Telecommunications System (UMTS); Medium Access Control (MAC) protocol specification (3GPP TS 25.321 version 7.8.0 Release 7);ETSI TS 125 321 ETSI Standards, Lis, Sophia Antipolis Cedex, France, vol. 3-R2, No. V7.8.0, Apr. 1, 2008, XP014041738 ISSN: 0000-0001 p. 89, paragraph 11.6.2.1-p. 90, paragraph 11.6.2.2 p. 96, paragraph 11.6.3.3. p. 97, paragraph 11.6.4.2.

European Search Report—EP11180766—Search Authority—Munich—Sep. 21, 2011.

3GPP; Technical Specification Group Radio Access Network;: "TS 36.300 V8.2.0—Evolved Universal Terrestrial Radio Access (E-UTRA) and Evolved Universal Terrestrial Radio Access Network (E-UTRAN); Overall description; Stage 2" 3rd Generation Partnership Project; Technical Specification (TS), vol. 36.300, No. v8.2.0, Sep. 1, 2007, XP002595686.

3GPP TS 36.321 v2.0.0 (Nov. 2007) 3rd Generation Partnership Project; Technical Specification Group Radio Access Network; Evolved Universal Terrestrial Radio Access (E-UTRA) Medium Access Control (MAC) protocol specification (Release 8) Vol:36.321, Nr:V2.0.0, pp. 1-23 XP002521802.

LG Electronics Inc, "NDI and Msg3", 3GPP TSG-RAN2 Meeting #62bis R2-083723, Jun. 30, 2008, pp. 1-3.

Taiwan Search Report—TW097149483—TIPO—Apr. 9, 2012.

"Universal Mobile Telecommunications System (UMTS); Medium Access Control (MAC) protocol specification (3GPP TS 25.321 version 7.9.0 Release 7); ETSI TS 125 321" ETSI Standard, European Telecommunications Standards Institute (ETSI), Sophia Antipolis Cedex, France, vol. 3-R2, No. V7.9.0, Jul. 1, 2008, XP014042116 cited in the application paragraph [11.2.1] paragraph [11.2.2] paragraph [11.2.3].

LG Electronics: "Optimized RA response reception", 3GPP TSG-RAN WG2 #59, R2-073327, Aug. 2007.

3rd Generation Partnership Project: "3GPP TS 36.213 V8.4.0 Technical Specification Group Radio Access Network; Evolved Universal Terrestrial Radio Access (E-UTRA); Physical layer procedures (Release 8)" [Online] Sep. 1, 2008, pp. 1-60, XP002581188 Retrieved from the Internet: URL:http://www.3gpp.org/ftp/Specs/archive/36_series/36.213/36213-840.zip> [retrieved on May 6, 2010] p. 30-p. 32.

"3rd Generation Partnership Project; Technical Specification Group Radio Access Network; Evolved Universal Terrestrial Radio Access (E-UTRA); Physical layer procedures (Release 8)" 3GPP Standard; 3GPP TS 36.213, 3rdGeneration Partnership Project (3GPP), Mobile Competence Centre; 650, Route Deslucioles; F-06921 Sophia-antipolis Cedex; France, No. V8.3.0, Nov. 2008, pp. 1-46.

TSG-RAN WG1: "LS reply on PDCCH for DL data arrival and random access response format", 3GPP TSG RAN WG1 Meeting #53, R1-082251, May 5-9, 2008.

LG Electronics Inc: "MAC Header Format for Random Access Response", 3GPP TSG-RAN WG2 #60, R2-074779, Nov. 2007.

\* cited by examiner

METHOD AND APPARATUS FOR SENDING AND RECEIVING RANDOM ACCESS RESPONSE IN A WIRELESS COMMUNICATION SYSTEM

I. CLAIM OF PRIORITY UNDER 35 U.S.C. §119

The present application for patent claims priority to Provisional U.S. Application Ser. No. 61/014,649, entitled "METHOD AND APPARATUS FOR USING A RANDOM ACCESS CHANNEL MESSAGE," filed Dec. 18, 2007, assigned to the assignee hereof, and expressly incorporated herein by reference.

BACKGROUND

I. Field

The present disclosure relates generally to communication, and more specifically to techniques for supporting random access in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base station that can support communication for a number of user equipments (UEs). A UE may transmit a random access preamble on the uplink when the UE desires to gain access to the system. A base station may receive the RA preamble and may respond with a random access response containing pertinent information for the UE. Radio resources are consumed to exchange messages between the UE and the base station for random access. It is desirable to efficiently send messages for random access.

SUMMARY

Techniques for supporting random access by UEs in a wireless communication system are described herein. In one design, a UE may transmit a random access (RA) preamble for random access. The UE may thereafter receive a random access response comprising a first part and a second part. The first part may include a list of N RA preamble identifiers (IDs) for N RA preambles being responded to by the random access response, where N may be a value of one or greater. The second part may include N individual RA responses for the N RA preambles being responded to.

The UE may receive a Medium Access Control (MAC) protocol data unit (PDU) comprising a MAC header and a MAC payload. In one design, the UE may obtain the first part from the MAC header and the second part from the MAC payload. The MAC PDU may be sent using a Random Access Radio Network Temporary Identifier (RA-RNTI). The UE may identify the MAC PDU as carrying the random access response based on the RA-RNTI. In another design, the UE may identify the MAC PDU as carrying the random access response based on a predefined value for a designated field of the MAC header. The UE may then obtain the first and second parts from the MAC payload.

The UE may process the first part to detect for an RA preamble ID of the RA preamble transmitted by the UE. If this RA preamble ID is not detected, then the UE may skip the second part. Otherwise, the UE may process the second part to obtain an individual RA response for the RA preamble transmitted by the UE.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. EUTRA is also referred to as 3GPP Long Term Evolution (LTE) and employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
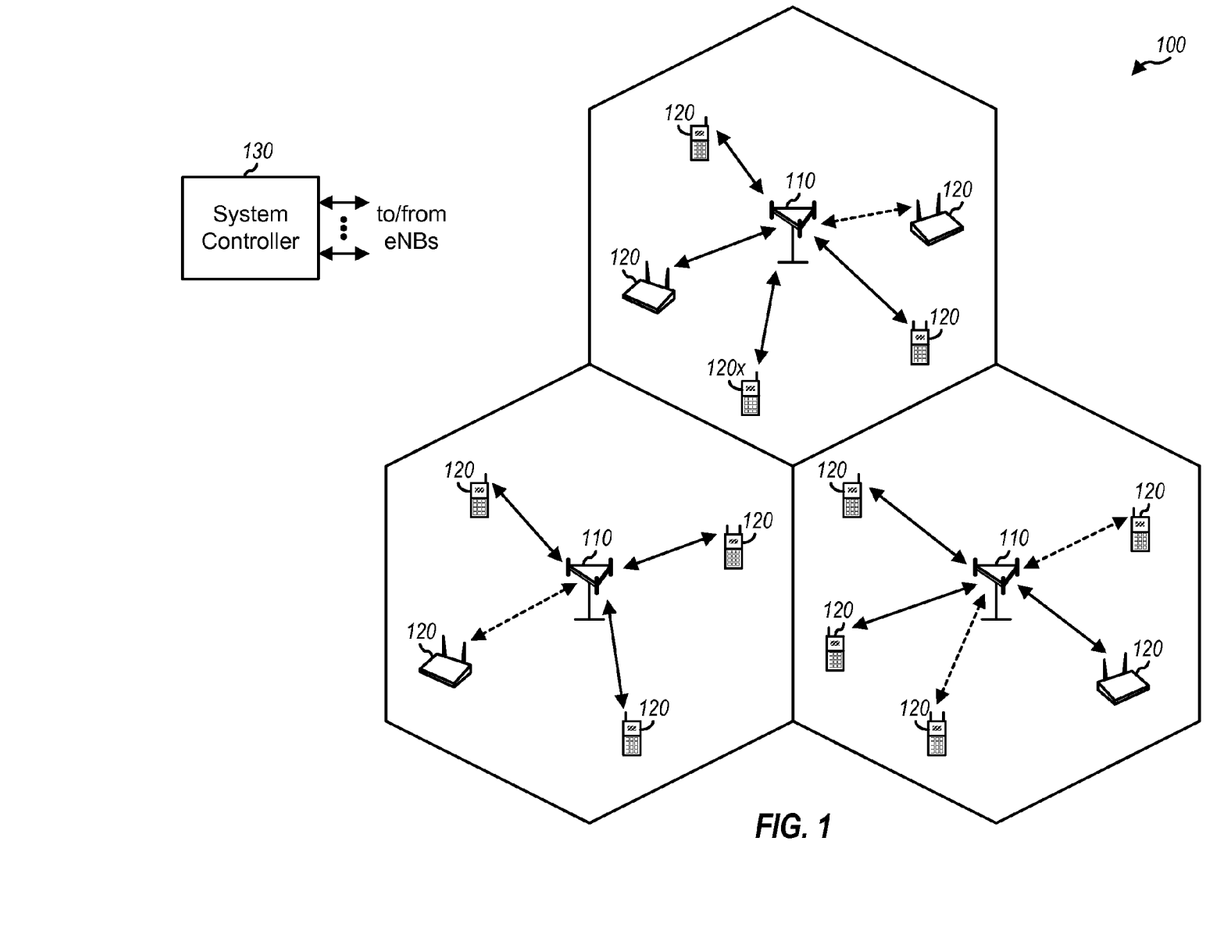
FIG. 1 shows a wireless communication system.

FIG. 1 shows a wireless communication system 100, which may be an LTE system. System 100 may include a number of evolved Node Bs (eNBs) 110 and other network entities. An eNB may be a fixed station that communicates with the UEs and may also be referred to as a Node B, a base station, an access point, etc. Each eNB provides communication coverage for a particular geographic area. To improve system capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area. A system controller 130 may couple to a set of eNBs and provide coordination and control for these eNBs.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with an eNB via the downlink and uplink. The downlink (or forward link) refers to the communication link from the eNB to the UE, and the uplink (or reverse link) refers to the communication link from the UE to the eNB. In FIG. 1, a solid line with double arrows indicates active communication between an eNB and a UE. A dashed line with double arrows indicates a UE performing random access.

A UE may perform a random access procedure in order to access the system and/or for other purposes. The terms "random access" and "system access" may be used interchangeably.

Figure 2:
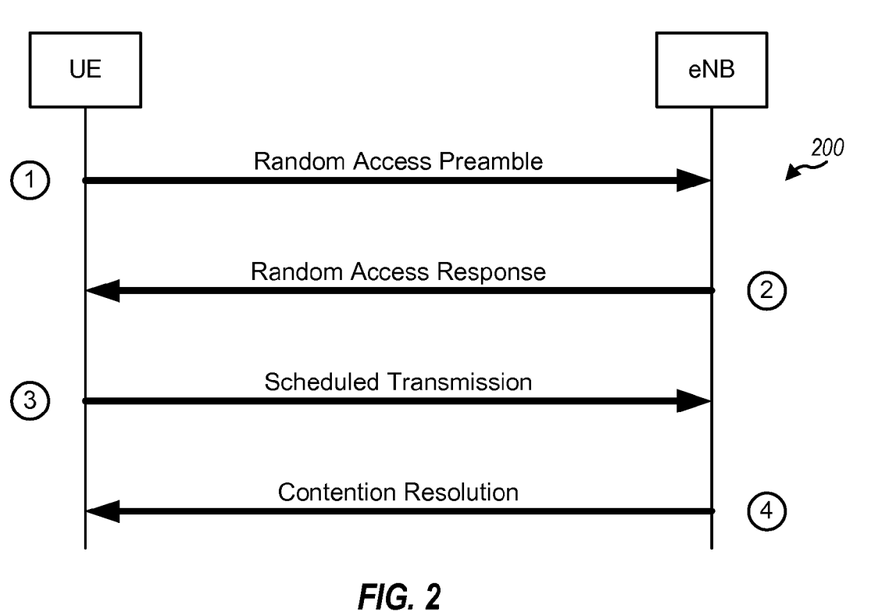
FIG. 2 shows a message flow for a random access procedure.

FIG. 2 shows a message flow 200 for a random access procedure. A given UE x may transmit a random access (RA) preamble on a Physical Random Access Channel (PRACH) whenever UE x desires to access the system (step 1). The RA preamble may also be referred to as Message 1, an access signature, an access probe, a random access probe, a signature sequence, etc. The RA preamble may be identified by an RA preamble ID.

An eNB may receive the RA preamble from UE x and possibly RA preambles from other UEs. The eNB may asynchronously respond to the RA preambles within a predetermined time period, which may be referred to as an RA response window. The eNB may send a random access response on a Downlink Shared Channel (DL-SCH) to respond to one or more RA preambles (step 2). The eNB may send the random access response to a set of UEs using an RA-RNTI applicable for these UEs. The random access response may also be referred to as Message 2 and may include various types of information, as described below.

UE x may perform the random access procedure while operating in any one of a number of connection states and may or may not have a Cell RNTI (C-RNTI) assigned to UE x when performing the random access procedure. A C-RNTI is a UE ID used to uniquely identify a UE to a cell and is valid only for that cell for the duration of a connection. UE x may be unable to inform the eNB whether UE x already has a C-RNTI with Message 1. The eNB may assign a temporary C-RNTI to UE x regardless of whether or not UE x already has a C-RNTI and may send this temporary C-RNTI in the random access response to UE x in step 2. UE x may use the temporary C-RNTI as its C-RNTI if UE x does not already have a valid C-RNTI prior to performing the random access procedure. However, if UE x already has a C-RNTI, then UE x may continue to use this C-RNTI and discard the temporary C-RNTI.

UE x may receive the random access response from the eNB and may extract the information sent to UE x. UE x may then send a scheduled transmission on the uplink to the eNB in accordance with the information received from the random access response (step 3). The scheduled transmission may also be referred to as Message 3. The eNB may send a message on the DL-SCH for contention resolution, if necessary (step 4). A collision may occur when multiple UEs send the same RA preamble on the PRACH. Contention resolution may be performed to resolve which UE is granted access. The message in step 4 may be addressed to a specific UE based on (i) a C-RNTI assigned to the UE prior to the random access procedure or (ii) a temporary C-RNTI assigned to the UE by the eNB in step 2 and a unique UE identity included in Message 3.

The random access procedure for LTE is described in 3GPP TS 36.300, entitled "Evolved Universal Terrestrial Radio Access (E-UTRA) and Evolved Universal Terrestrial Radio Access Network (E-UTRAN); Overall description; Stage 2," and in 3GPP TS 36.321, entitled "Evolved Universal Terrestrial Radio Access (E-UTRA) Medium Access Control (MAC) protocol specification." These documents are publicly available.

The random access response sent by the eNB in step 2 may include one or more individual RA responses for one or more RA preambles received from one or more UEs. One individual RA response may be provided for each RA preamble being responded to by the eNB. For clarity, in much of the description herein, "random access response" refers to a response sent by an eNB for one or more RA preambles, and "individual RA response" refers to a response for one RA preamble.

An individual RA response may include various types of information that may be pertinent for communication between a UE and an eNB. In one design, an individual RA response may have a fixed size and may include a predefined set of fields. This design may simplify processing at the eNB and the UE. In another design, an individual RA response may have a variable size and may include a set of fields that may be dependent on the type of RA preamble being responded to by the eNB. This design may result in fewer bits being used for the individual RA response in some scenarios. Table 1 shows a set of fields for an individual RA response in accordance with one design.

TABLE 1

Individual RA Response

| Parameter | Length (# bits) | Description |
| --- | --- | --- |
| RA preamble ID | 6 | Identify an RA preamble being responded to. |
| Timing advance (TA) | 11 | Indicate adjustment to the transmit timing of a UE. |
| Uplink grant | 21 | Indicate resources granted to the UE for uplink transmission. |
| Temporary C-RNTI | 16 | Temporary UE identity during random access. |

In one design, the RA preamble ID (RAPID) is a 6-bit value composed of (i) a 5-bit random ID that may be randomly selected by a UE and (ii) one additional bit used to convey additional information in the RA preamble. In one design, the timing advance is an 11-bit value indicating the amount of timing adjustment for the uplink by the UE. In one design, the uplink grant comprises 40 or fewer bits (e.g., 21 bits) to indicate the resources to use on the uplink by the UE. The uplink grant in the individual RA response may have the same format as an uplink grant sent on a Physical Downlink Control Channel (PDCCH) for uplink data transmission. Alternatively, the uplink grant in the individual RA response may have fewer bits than the uplink grant for uplink data transmission due to fewer degrees of freedom and less channel information available when determining the uplink grant in the individual RA response. In one design, the temporary C-RNTI is a 16-bit value selected by the eNB and assigned to the UE for use as a temporary UE identity during random access. The temporary C-RNTI may be used as a C-RNTI if the UE does not already have a C-RNTI.

The various parameters/fields of the individual RA response may also have other lengths. For example, the length of the timing advance may be dependent on the maximum cell size and the desired granularity of the timing advance. The length of the uplink grant may be dependent on the types of information to send for the uplink grant (e.g., modulation and coding scheme (MCS), resource block, validity time for time division duplexing (TDD), etc.) and the number of possible choices for each type of information.

An individual RA response may also include different and/or other fields for other information. For example, an individual RA response may include backoff control information, which may be used to control transmission of RA preambles by a UE in case of collision. For clarity, much of the description below assumes the design shown in Table 1.

In one design, a random access response may carry a variable number of individual RA responses and may be sent in a MAC PDU. The random access response may be sent using various MAC PDU formats, two of which are described below.

Figure 3:
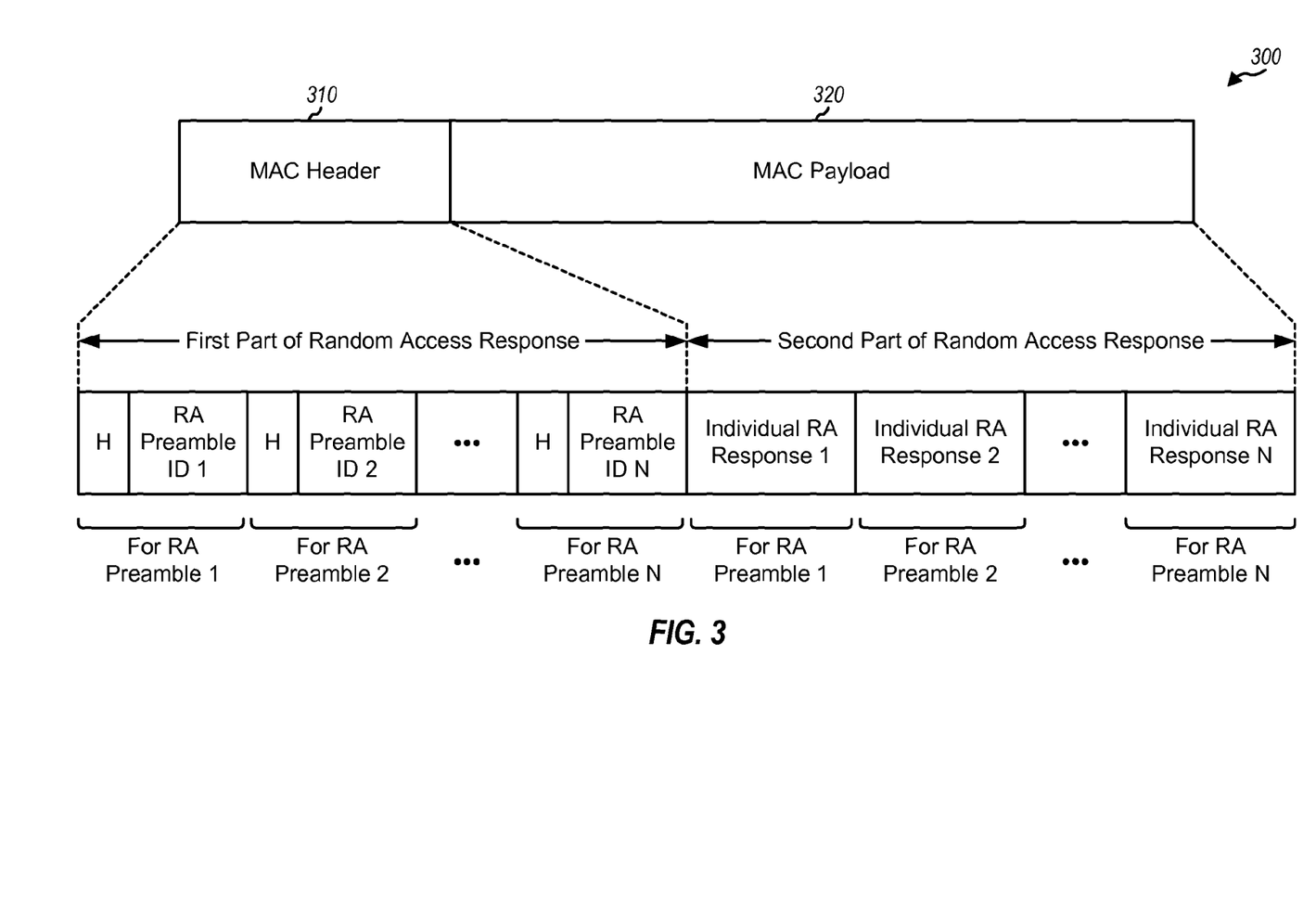
FIG. 3 shows a MAC PDU for sending a random access response.

FIG. 3 shows a design of a MAC PDU 300 that may be used to send a random access response. In this design, MAC PDU 300 includes a MAC header 310 and a MAC payload 320. MAC header 310 carries a first part of the random access response, which includes a list of N RA preamble IDs 1 through N for N RA preambles being responded to by the random access response, where N may be a value of one or greater. In general, the RA preamble IDs may be arranged in any order by an eNB. In one design, the eNB may order the RA preamble IDs in increasing or decreasing order according to the values of the RA preamble IDs. When ordered, a UE may stop parsing the random access response after seeing an RA preamble ID with a value past (e.g., larger or smaller than) the one used by the UE. The variable number of RA preamble IDs in the first part may be indicated in various manners. In the design shown in FIG. 3, each RA preamble ID may be associated with one or more additional bits (denoted as "H") that may be used to indicate (i) whether another RA preamble ID or the first individual RA response will follow, (ii) the type of information being sent for the RA preamble ID, and/or (iii) other information. In another design not shown in FIG. 3, MAC header 310 may include a length field that indicates the number of RA preambles being responded to.

MAC payload 320 carries a second part of the random access response, which includes N individual RA responses 1 through N for the N RA preambles being responded to. Each individual RA response may have a fixed size and may include the set of fields shown in Table 1. The N individual RA responses in the second part may be arranged in the same order as the N RA preamble IDs in the first part. Thus, the n-th individual RA response in MAC payload 320 may correspond to the n-th RA preamble ID in MAC header 310, for n=1, . . . , N.

Figure 4:
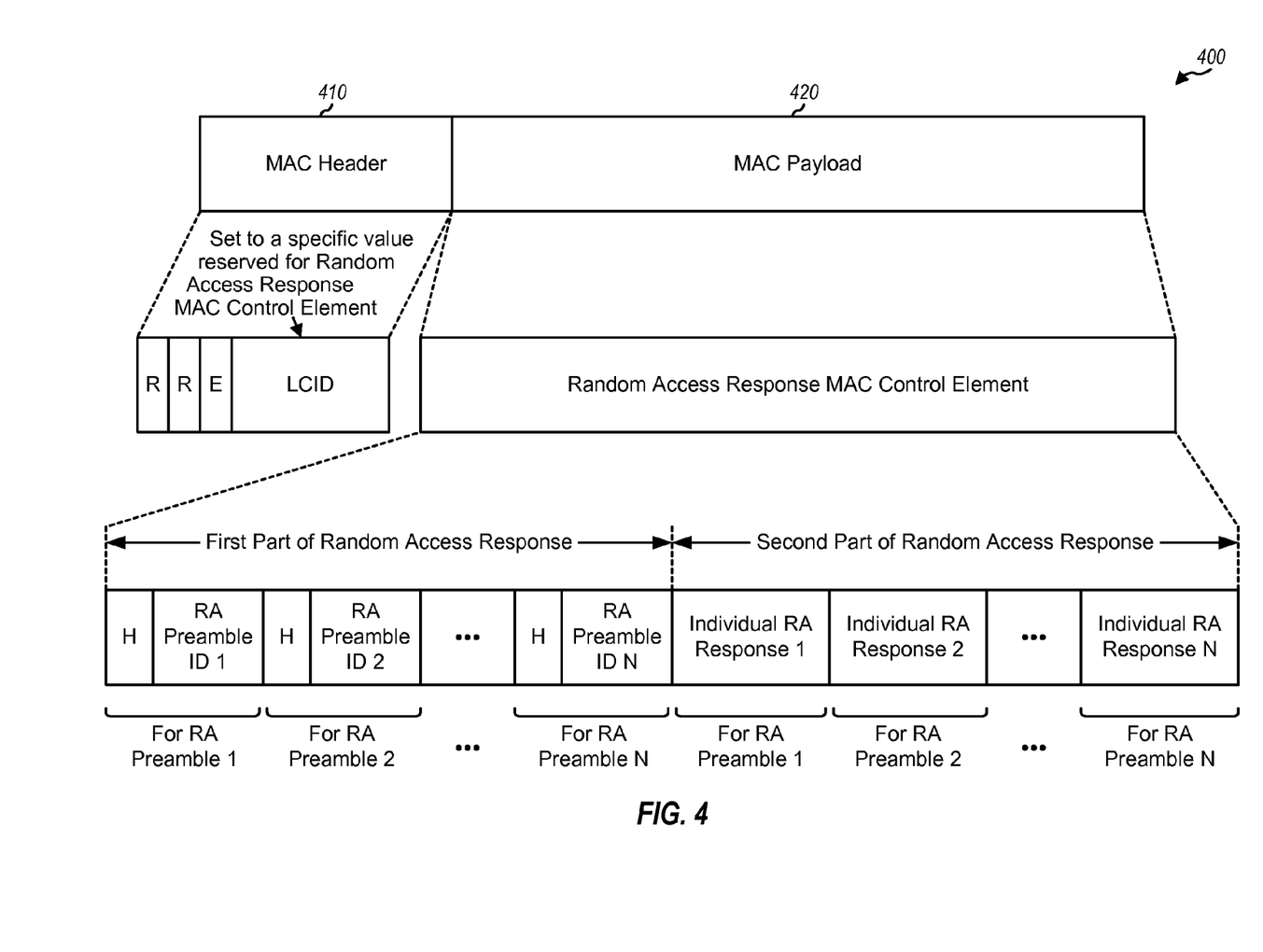
FIG. 4 shows another MAC PDU for sending a random access response.

FIG. 4 shows a design of a MAC PDU 400 that may also be used to send a random access response. In this design, MAC PDU 400 includes a MAC header 410 and a MAC payload 420. MAC header 410 carries an R/R/E/LCID MAC subheader composed of a reserved (R) field, another R field, an extension (E) field, and a logical channel ID (LCID) field. The R fields are reserved for future use. The E field indicates whether another set of R, R, E and LCID fields will follow. Data for one or more logical channels may be sent in a stream of MAC PDUs, with each logical channel being assigned a different logical channel ID. The LCID field typically carries a logical channel ID of a logical channel having its data sent in MAC payload 420. In the design shown in FIG. 4, a specific logical channel ID may be reserved and used to indicate that MAC payload 420 carries a random access response instead of data for a logical channel. This design treats the random access response as a MAC control element of a variable size.

MAC payload 420 carries a MAC control element for a random access response. This MAC control element may be referred to as a Random Access Response MAC Control Element, an RA Response Control Element, etc. The MAC control element carries the first and second parts of the random access response. The first part includes a list of N RA preamble IDs 1 through N for N RA preambles being responded to by the random access response, where N may be a value of one or greater. Each RA preamble ID may be associated with one or more additional bits (denoted as "H") that may be used to indicate any of the information described above for FIG. 3. The second part includes N individual RA responses 1 through N for the N RA preambles being responded to. Each individual RA response may have a fixed size and may include the set of fields shown in Table 1. The N individual RA responses in the second part may be arranged in the same order as the N RA preamble IDs in the first part.

Other predefined MAC subheaders may also be used to indicate that MAC payload 420 carries a MAC control element for a random access response. For example, a 2-byte R/R/E/LCID/F/L MAC subheader with six fields of R, R, E, LCID, F and L may be used to indicate the presence of a MAC control element for a random access response, where L denotes the length of MAC payload 420 and F denotes the length of the L field.

FIGS. 3 and 4 show two example MAC PDU formats that may be used to send a random access response for a variable number of RA preambles. In the design shown in FIG. 3, a special MAC PDU format is defined for the random access response, and this MAC PDU format excludes normal MAC header fields. An eNB may generate a cyclic redundancy check (CRC) for a MAC PDU carrying a random access response. The eNB may mask this CRC with an RA-RNTI and may send the masked CRC with the MAC PDU. A UE that transmitted an RA preamble may detect for a MAC PDU carrying a random access response. The UE may de-mask a CRC for a received MAC PDU with the RA-RNTI and may check the received MAC PDU with the de-masked CRC. A physical layer at the UE may perform the CRC check, and a MAC layer at the UE may process the received MAC PDU to obtain the random access response. In this case, the MAC layer may wait for the CRC check result from the physical layer before processing the received MAC PDU to obtain the random access response. The design in FIG. 3 may reduce MAC overhead while still allowing UEs to detect for MAC PDUs carrying random access responses.

In the design shown in FIG. 4, a random access response may be sent using an existing MAC PDU format for a MAC control element. A specific LCID value may be reserved and used to indicate that the MAC control element is for a random access response instead of some other control information. This design may simplify implementation and operation of a UE. For example, the UE may employ a single parser to read the MAC header of each received MAC PDU and determine the content sent in the MAC payload based on the parsed results. The MAC layer at the UE can determine whether a received MAC PDU carries a random access response without requiring outputs from other layers such as the physical layer.

Figure 5:
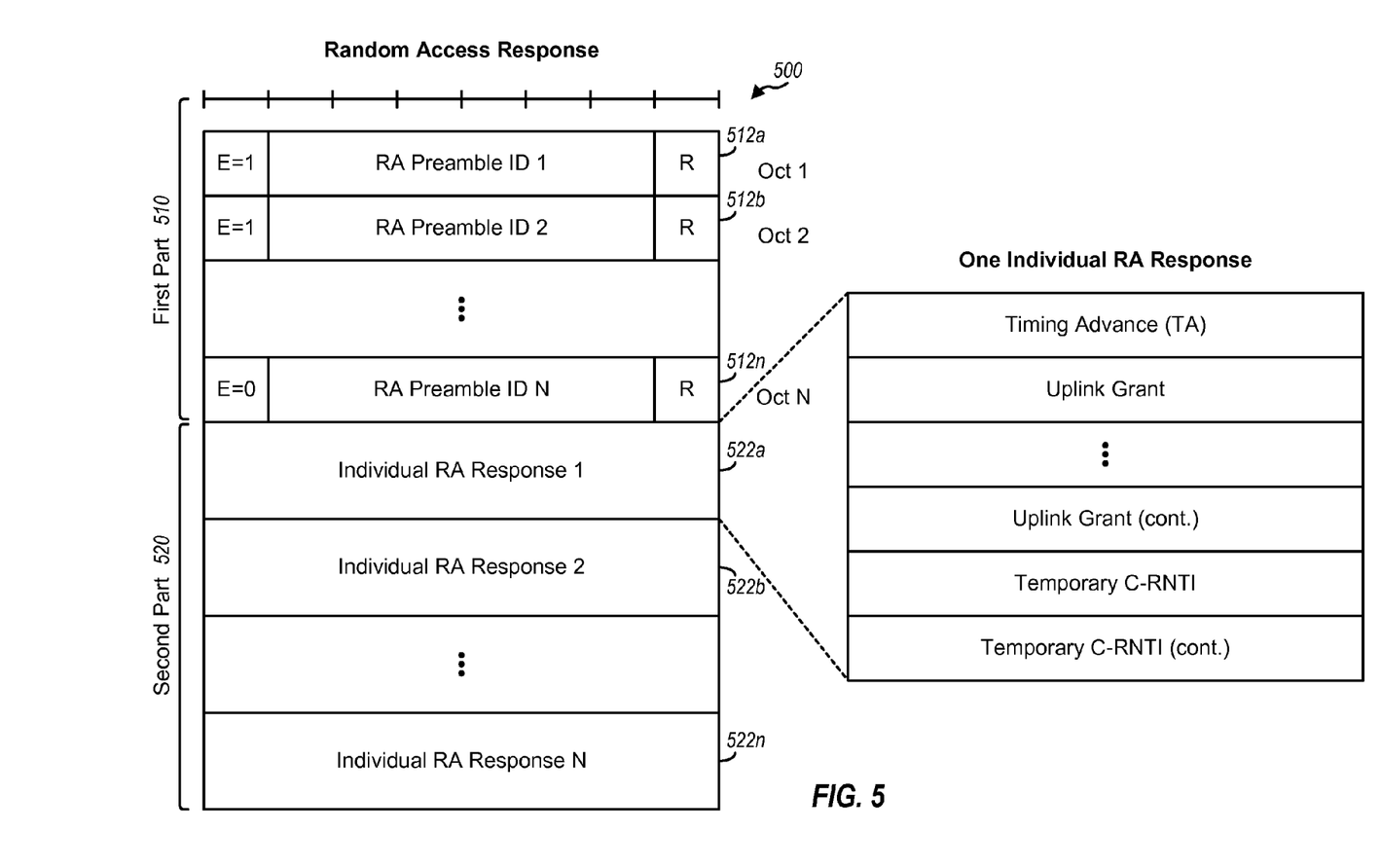
FIG. 5 shows a design of a random access response.

FIG. 5 shows a design of a random access response 500, which may be used for both MAC PDU 300 in FIG. 3 and MAC PDU 400 in FIG. 4. Random access response 500 includes a first part 510 followed by a second part 520. In the design shown in FIG. 5, first part 510 includes N entries 512a through 512n for N RA preamble IDs. Each entry 512 may have a fixed size (e.g., of 8 bits or one octet) and may include an extension (E) field, a RA preamble ID field, and a reserved (R) field. For each entry 512, the E field may be set to (i) a first value (e.g., '1') to indicate that another entry for another RA preamble ID will follow or (ii) a second value (e.g., '0') to indicate that no other entry will follow. The E field of each entry 512 except for the last entry may be set to '1', and the E field of the last entry 512n may be set to '0', as shown in FIG. 5. First part 510 may end after the last entry 512n having its E field set to '0', and second part 520 may start after the last entry 512n. The RA preamble ID field may carry the RA preamble ID of an RA preamble being responded to by the random access response. The R field may be used to convey any pertinent information, e.g., an indication of the type of information being sent in an individual RA response or in place of the individual RA response for the associated RA preamble ID.

In the design shown in FIG. 5, second part 520 includes N individual RA responses 522a through 522n for the N RA preamble IDs included in first part 510. The N individual RA responses may be arranged in the same order as the N corresponding RA preamble IDs. Each individual RA response 522 may have a fixed size (e.g., of 48 bits or six octets for the design shown in Table 1) and may be referred to as a block. In the design shown in FIG. 5, each individual RA response 522 may include a timing advance field, an uplink grant field, and a temporary C-RNTI field. For a given individual RA response 522, the timing advance field may carry a timing advance for a UE whose RA preamble is being responded to by the individual RA response. The uplink grant field may carry an uplink grant for the UE. The temporary C-RNTI field may carry a temporary C-RNTI assigned to the UE.

FIG. 5 shows a specific design of random access response 500. In general, each entry in the first part may include any set of fields, and each field may have any length. The fields in each entry may also be arranged differently than shown in FIG. 5. Each individual RA response may also include any set of fields for any parameters, and each field may have any length. The fields in the individual RA response may also be arranged in any order.

In the design shown in FIG. 5, random access response 500 may include a variable number of individual RA responses. Furthermore, the list of RA preamble IDs for the RA preambles being responded to is located up-front. This arrangement may allow a UE to quickly scan through the list of RA preamble IDs to determine whether the RA preamble transmitted by the UE is being responded to by the random access response. The UE may skip the processing of the second part if the RA preamble ID for the UE is not found in the first part. If an RA preamble match is found, then the UE may process the second part to obtain the individual RA response sent to the UE.

Figure 6:
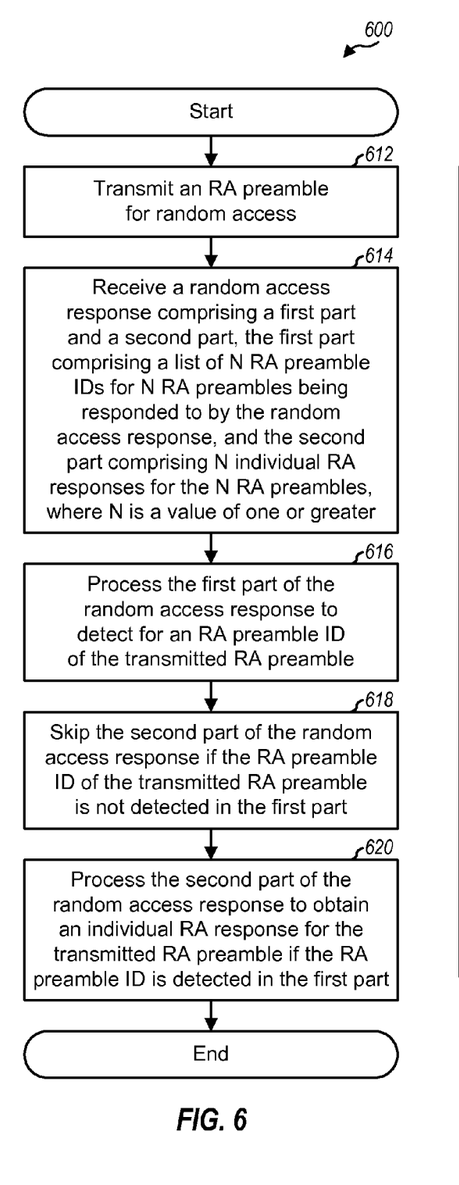
FIG. 6 shows a process for performing random access by a UE.

FIG. 6 shows a design of a process 600 for performing random access by a UE. The UE may transmit an RA preamble for random access (block 612). The UE may thereafter receive a random access response comprising a first part and a second part (block 614). The first part may comprise a list of N RA preamble IDs for N RA preambles being responded to by the random access response, where N may be a value of one or greater. The second part may comprise N individual RA responses for the N RA preambles. The first and second parts may have the format shown in FIG. 5 or some other format.

The UE may receive a MAC PDU comprising a MAC header and a MAC payload. In one design, the UE may obtain the first part from the MAC header and the second part from the MAC payload, e.g., as shown in FIG. 3. The UE may process the MAC PDU with an RA-RNTI applicable for a set of UEs and may identify the MAC PDU as carrying the random access response if the processing with the RA-RNTI is successful, e.g., if the CRC check passes. In another design, the UE may identify the MAC PDU as carrying the random access response based on a predefined value for a designated field of the MAC header. If the MAC PDU carries the random access response, then the UE may obtain the first and second parts from the MAC payload, e.g., as shown in FIG. 4.

The UE may process the first part of the random access response to detect for an RA preamble ID of the RA preamble transmitted by the UE (block 616). In one design, the N RA preamble IDs may be ordered in the first part of the random access response, for example, according to increasing or decreasing RA preamble IDs. In this case, the UE may stop processing the random access response as soon as an RA preamble ID past (e.g., higher or lower than) the RA preamble ID selected by the UE is detected in the first part. The UE may skip the second part of the random access response if the RA preamble ID of the transmitted RA preamble is not detected in the first part (block 618). The UE may process the second part to obtain an individual RA response for the transmitted RA preamble if the RA preamble ID is detected in the first part (block 620). In one design, the order of the N individual RA responses in the second part corresponds to the order of the N RA preamble IDs in the first part. The individual RA response corresponding to the n-th RA preamble ID in the first part may thus be the n-th individual RA response in the second part.

Figure 7:
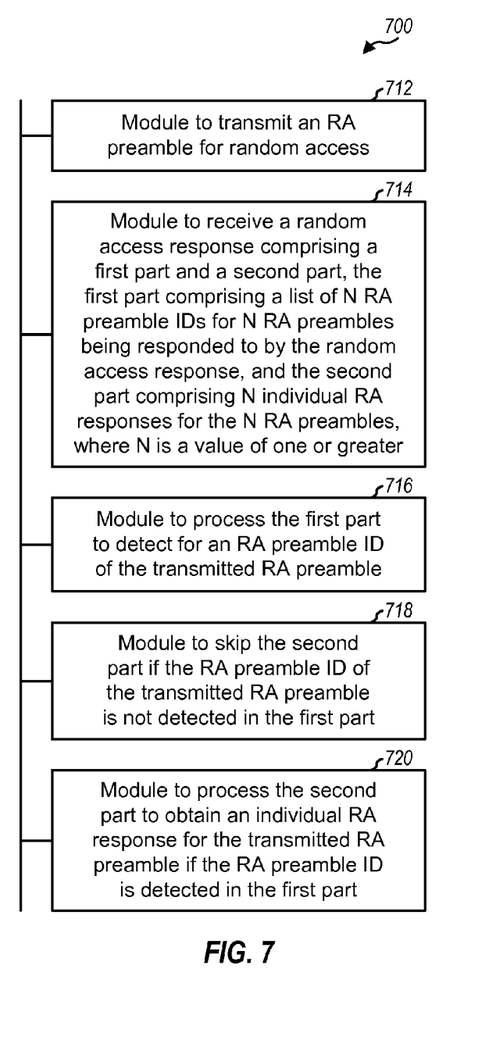
FIG. 7 shows an apparatus for performing random access.

FIG. 7 shows a design of an apparatus 700 for performing random access. Apparatus 700 includes a module 712 to transmit an RA preamble for random access and a module 714 to receive a random access response comprising a first part and a second part, with the first part comprising a list of N RA preamble IDs for N RA preambles being responded to by the random access response, and the second part comprising N individual RA responses for the N RA preambles. Apparatus 700 further includes a module 716 to process the first part to detect for an RA preamble ID of the transmitted RA preamble, a module 718 to skip the second part if the RA preamble ID of the transmitted RA preamble is not detected in the first part, and a module 720 to process the second part to obtain an individual RA response for the transmitted RA preamble if the RA preamble ID is detected in the first part.

Figure 8:
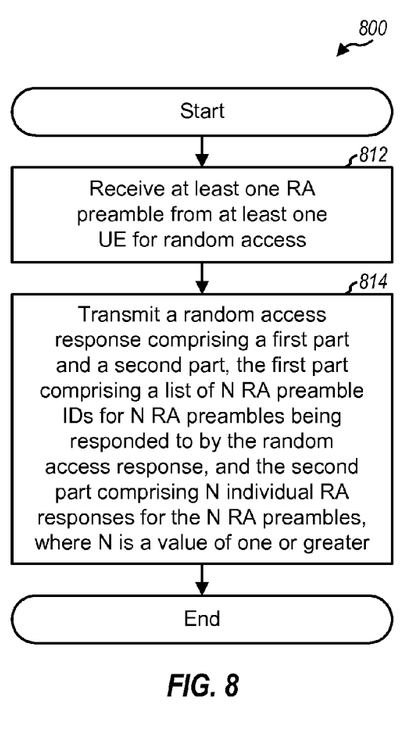
FIG. 8 shows a process for supporting random access by a base station.

FIG. 8 shows a design of a process 800 for supporting random access. Process 800 may be performed by an eNB (as described below) or by some other entity. The eNB may receive at least one RA preamble from at least one UE for random access (block 812). The eNB may transmit a random access response comprising a first part and a second part (block 814). The first part may comprise a list of N RA preamble IDs for N RA preambles being responded to by the random access response, where N may be a value of one or greater. The second part may comprise N individual RA responses for the N RA preambles. The first and second parts may have the format shown in FIG. 5 or some other format. The eNB may receive the at least one RA preamble in at least one subframe. The eNB may transmit the random access response asynchronously within a predetermined time window of each RA preamble being responded to.

The eNB may generate a MAC PDU comprising a MAC header and a MAC payload. In one design, the eNB may map the first part of the random access response to the MAC header and may map the second part of the random access response to the MAC payload, e.g., as shown in FIG. 3. The eNB may process the MAC PDU with an RA-RNTI applicable for a set of UEs, and the RA-RNTI may be used to identify the MAC PDU as carrying the random access response. In another design, the eNB may set a designated field of the MAC header to a predefined value to indicate the MAC PDU carrying the random access response. The eNB may then map the first and second parts of the random access response to the MAC payload, e.g., as shown in FIG. 4.

Figure 9:
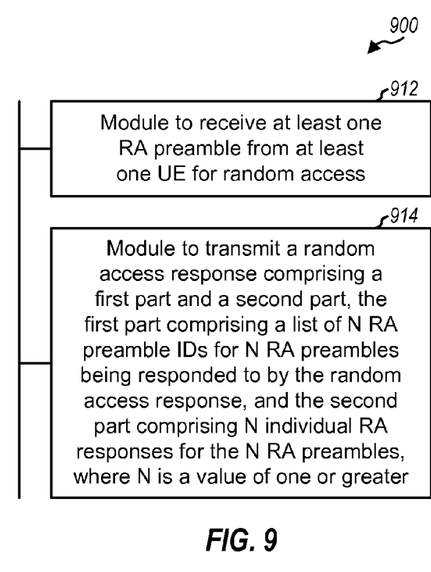
FIG. 9 shows an apparatus for supporting random access.

FIG. 9 shows a design of an apparatus 900 for supporting random access. Apparatus 900 includes a module 912 to receive at least one RA preamble from at least one UE for random access, and a module 914 to transmit a random access response comprising a first part and a second part, with the first part comprising a list of N RA preamble IDs for N RA preambles being responded to by the random access response, and the second part comprising N individual RA responses for the N RA preambles, where N may be a value of one or greater.

The modules in FIGS. 7 and 9 may comprise processors, electronics devices, hardware devices, electronics components, logical circuits, memories, etc., or any combination thereof.

Figure 10:
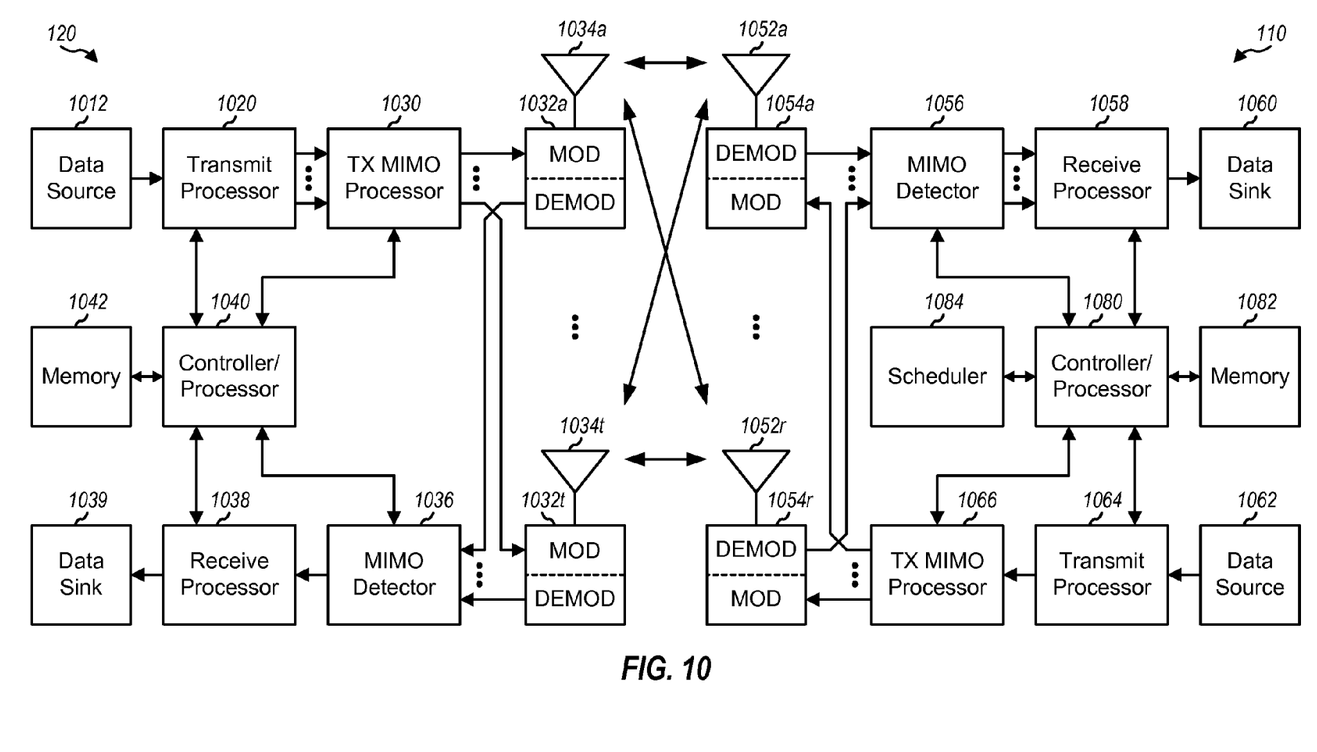
FIG. 10 shows a block diagram of the UE and the base station.

FIG. 10 shows a block diagram of a design of an eNB/base station 110 and a UE 120, which may be one of the eNBs and one of the UEs in FIG. 1. In this design, UE 120 is equipped with T antennas 1034a through 1034t, and eNB 110 is equipped with R antennas 1052a through 1052r, where in general $T \geq 1$ and $R \geq 1$.

At UE 120, a transmit processor 1020 may receive data from a data source 1012, process the data based on one or more modulation and coding schemes, and provide data symbols. Transmit processor 1020 may also process signaling/control information (e.g., an RA preamble) and provide signaling symbols. A transmit (TX) multiple-input multiple-output (MIMO) processor 1030 may multiplex the data symbols, the signaling symbols, pilot symbols, and possibly other symbols. TX MIMO processor 1030 may perform spatial processing (e.g., preceding) on the multiplexed symbols, if applicable, and provide T output symbol streams to T modulators (MODs) 1032a through 1032t. Each modulator 1032 may process a respective output symbol stream (e.g., for SC-FDMA) to obtain an output sample stream. Each modulator 1032 may further process (e.g., convert to analog, amplify, filter, and upconvert) the output sample stream to obtain an uplink signal. T uplink signals from modulators 1032a through 1032t may be transmitted via T antennas 1034a through 1034t, respectively.

At eNB 110, antennas 1052a through 1052r may receive the uplink signals from UE 120 and possibly other UEs and may provide received signals to demodulators (DEMODs) 1054a through 1054r, respectively. Each demodulator 1054 may condition (e.g., filter, amplify, downconvert, and digitize) a respective received signal to obtain received samples. Each demodulator 1054 may further process the received samples (e.g., for SC-FDMA) to obtain received symbols. A MIMO detector 1056 may obtain received symbols from all R demodulators 1054a through 1054r, perform MIMO detection on the received symbols if applicable, and provide detected symbols. A receive processor 1058 may process (e.g., demodulate, deinterleave, and decode) the detected symbols and provide decoded data for UE 120 and/or other UEs to a data sink 1060. Receive processor 1058 may also provide detected RA preambles from UEs performing random access to a controller/processor 1080.

On the downlink, at eNB 110, data for one or more UEs from a data source 1062 and signaling (e.g., a random access response) from controller/processor 1080 may be processed by a transmit processor 1064, precoded by a TX MIMO processor 1066 if applicable, conditioned by modulators 1054a through 1054r, and transmitted to UE 120 and other UEs. At UE 120, the downlink signals from eNB 110 may be received by antennas 1034, conditioned by demodulators 1032, processed by a MIMO detector 1036 if applicable, and further processed by a receive processor 1038 to obtain the data and signaling (e.g., a random access response) transmitted by eNB 110.

Controllers/processors 1040 and 1080 may direct the operation at UE 120 and eNB 110, respectively. Controller/processor 1040 at UE 120 may perform or direct process 600 in FIG. 6 and/or other processes for the techniques described herein. Controller/processor 1080 at eNB 110 may perform or direct process 800 in FIG. 8 and/or other processes for the techniques described herein. Memories 1042 and 1082 may store data and program codes for UE 120 and eNB 110, respectively. A scheduler 1084 may schedule UEs for downlink and/or uplink transmission and may provide assignments of resources for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    transmitting a random access (RA) preamble for random access; and
    receiving a random access response including a first part and a second part, the first part including a list of N RA preamble identifiers (IDs) for N RA preambles being responded to by the random access response, and the second part including N individual RA responses for the N RA preambles, where N is a value of one or greater, wherein the first part includes N entries, each entry including an extension (E) field and an RA preamble ID field, the extension field being set to a first value to indicate another entry will follow in the first part or a second value to indicate no other entry will follow in the first part, and the RA preamble ID field carrying an RA preamble ID of an RA preamble being responded to by the random access response, wherein the first part includes a header and the second part includes a payload.

2. The method of claim 1, wherein the second part includes the N individual RA responses arranged in same order as the N RA preamble IDs in the first part.

3. The method of claim 1, further including:
    processing the first part of the random access response to detect for an RA preamble ID of the transmitted RA preamble.

4. The method of claim 3, where the N RA preamble IDs are arranged in increasing or decreasing order in the first part, and wherein the processing the first part includes reading the first part until an RA preamble ID in the first part is past the RA preamble ID of the transmitted RA preamble.

5. The method of claim 3, further including:
    not processing the second part of the random access response if the RA preamble ID of the transmitted RA preamble is not detected in the first part; and
    processing the second part of the random access response to obtain an individual RA response for the transmitted RA preamble if the RA preamble ID is detected in the first part.

6. The method of claim 1, wherein each individual RA response has a fixed size and includes one of a timing advance, an uplink grant, and a temporary Cell Radio Network Temporary Identifier (C-RNTI) for one user equipment (UE).

7. The method of claim 1, wherein the receiving the random access response includes
    receiving a Medium Access Control (MAC) protocol data unit (PDU) comprising including a MAC header and a MAC payload,
    obtaining the first part of the random access response from the MAC header, and
    obtaining the second part of the random access response from the MAC payload.

8. The method of claim 7, wherein the receiving the random access response further includes
    processing the MAC PDU with a Random Access Radio Network Temporary Identifier (RA-RNTI) applicable for a set of user equipments (UEs), and
    identifying the MAC PDU as carrying the random access response if the processing with the RA-RNTI is successful.

9. The method of claim 1, wherein the receiving the random access response includes
    receiving a Medium Access Control (MAC) protocol data unit (PDU) including a MAC header and a MAC payload,
    identifying the MAC PDU as carrying the random access response based on a predefined value for a designated field of the MAC header, and
    obtaining the first and second parts of the random access response from the MAC payload if the MAC PDU carries the random access response.

10. An apparatus for wireless communication, comprising:
    at least one processor configured to transmit a random access (RA) preamble for random access, and to receive a random access response including a first part and a second part, the first part including a list of N RA preamble identifiers (IDs) for N RA preambles being responded to by the random access response, and the second part including N individual RA responses for the N RA preambles, where N is a value of one or greater, wherein the first part comprise includes N entries, each entry including an extension (E) field and an RA preamble ID field, the extension field being set to a first value to indicate another entry will follow in the first part or a second value to indicate no other entry will follow in the first part, and the RA preamble ID field carrying an RA preamble ID of an RA preamble being responded to by the random access response, wherein the first part includes a header and the second part includes a payload.

11. The apparatus of claim 10, wherein the at least one processor is configured to process the first part of the random access response to detect for an RA preamble ID of the transmitted RA preamble, to not process the second part of the random access response if the RA preamble ID of the transmitted RA preamble is not detected in the first part, and to process the second part of the random access response to obtain an individual RA response for the transmitted RA preamble if the RA preamble ID is detected in the first part.

12. The apparatus of claim 10, wherein the at least one processor is configured to receive a Medium Access Control (MAC) protocol data unit (PDU) including a MAC header and a MAC payload, to obtain the first part of the random access response from the MAC header, and to obtain the second part of the random access response from the MAC payload.

13. The apparatus of claim 10, wherein the at least one processor is configured to receive a Medium Access Control (MAC) protocol data unit (PDU) including a MAC header and a MAC payload, to identify the MAC PDU as carrying the random access response based on a predefined value for a designated field of the MAC header, and to obtain the first and second parts of the random access response from the MAC payload if the MAC PDU carries the random access response.

14. An apparatus for wireless communication, comprising:
    means for transmitting a random access (RA) preamble for random access; and
    means for receiving a random access response including a first part and a second part, the first part including a list of N RA preamble identifiers (IDs) for N RA preambles being responded to by the random access response, and the second part including N individual RA responses for the N RA preambles, where N is a value of one or greater, wherein the first part includes N entries, each entry including an extension (E) field and an RA preamble ID field, the extension field being set to a first value to indicate another entry will follow in the first part or a second value to indicate no other entry will follow in the first part, and the RA preamble ID field carrying an RA preamble ID of an RA preamble being responded to by the random access response, wherein the first part includes a header and the second part includes a payload.

15. The apparatus of claim 14, further including:
    means for processing the first part of the random access response to detect for an RA preamble ID of the transmitted RA preamble;
    means for not processing the second part of the random access response if the RA preamble ID of the transmitted RA preamble is not detected in the first part; and
    means for processing the second part of the random access response to obtain an individual RA response for the transmitted RA preamble if the RA preamble ID is detected in the first part.

16. The apparatus of claim 14, wherein the means for receiving the random access response includes
    means for receiving a Medium Access Control (MAC) protocol data unit (PDU) including a MAC header and a MAC payload,
    means for obtaining the first part of the random access response from the MAC header, and
    means for obtaining the second part of the random access response from the MAC payload.

17. The apparatus of claim 14, wherein the means for receiving the random access response includes
    means for receiving a Medium Access Control (MAC) protocol data unit (PDU) including a MAC header and a MAC payload,
    means for identifying the MAC PDU as carrying the random access response based on a predefined value for a designated field of the MAC header, and
    means for obtaining the first and second parts of the random access response from the MAC payload if the MAC PDU carries the random access response.

18. A computer program product, comprising:
    a non-transitory computer-readable medium comprising:
        code for causing at least one computer to transmit a random access (RA) preamble for random access, and
        code for causing the at least one computer to receive a random access response including a first part and a second part, the first part including a list of N RA preamble identifiers (IDs) for N RA preambles being responded to by the random access response, and the second part including N individual RA responses for the N RA preambles, where N is a value of one or greater, wherein the first part includes N entries, each entry including an extension (E) field and an RA preamble ID field, the extension field being set to a first value to indicate another entry will follow in the first part or a second value to indicate no other entry will follow in the first part, and the RA preamble ID field carrying an RA preamble ID of an RA preamble being responded to by the random access response, wherein the first part includes a header and the second part includes a payload.

19. The computer program product of claim 18, wherein the non-transitory computer-readable medium further includes:
    code for causing the at least one computer to process the first part of the random access response to detect for an RA preamble ID of the transmitted RA preamble;
    code for causing the at least one computer to not process the second part of the random access response if the RA preamble ID of the transmitted RA preamble is not detected in the first part; and
    code for causing the at least one computer to process the second part of the random access response to obtain an individual RA response for the transmitted RA preamble if the RA preamble ID is detected in the first part.

20. A method for wireless communication, comprising:
    receiving at least one random access (RA) preamble from at least one user equipment (UE) for random access; and
    transmitting a random access response including a first part and a second part, the first part including a list of N RA preamble identifiers (IDs) for N RA preambles being responded to by the random access response, and the second part including N individual RA responses for the N RA preambles, where N is a value of one or greater, wherein the first part includes N entries, each entry including an extension (E) field and an RA preamble ID field, the extension field being set to a first value to indicate another entry will follow in the first part or a second value to indicate no other entry will follow in the first part, and the RA preamble ID field carrying an RA preamble ID of an RA preamble being responded to by the random access response, wherein the first part includes a header and the second part includes a payload.

21. The method of claim 20, further including:
    arranging the N RA preamble IDs in increasing or decreasing order in the first part.

22. The method of claim 20, wherein the second part includes the N individual RA responses arranged in same order as the N RA preamble IDs in the first part, and wherein each individual RA response has a fixed size and includes one of a timing advance, an uplink grant, and a temporary Cell Radio Network Temporary Identifier (C-RNTI) for one UE.

23. The method of claim 20, wherein the sending the random access response includes
generating a Medium Access Control (MAC) protocol data unit (PDU) including a MAC header and a MAC payload,
mapping the first part of the random access response to the MAC header, and
mapping the second part of the random access response to the MAC payload.

24. The method of claim 23, wherein the sending the random access response further includes
processing the MAC PDU with a Random Access Radio Network Temporary Identifier (RA-RNTI) applicable for a set of user equipments (UEs), the RA-RNTI being used to identify the MAC PDU as carrying the random access response.

25. The method of claim 20, wherein the sending the random access response includes
generating a Medium Access Control (MAC) protocol data unit (PDU) including a MAC header and a MAC payload,
setting a designated field of the MAC header to a predefined value to indicate the MAC PDU carrying the random access response, and
mapping the first and second parts of the random access response to the MAC payload.

26. The method of claim 20, wherein the receiving the at least one RA preamble includes receiving the at least one RA preamble in at least one subframe, and wherein the transmitting the random access response includes transmitting the random access response asynchronously within a predetermined time window of each of the N RA preambles being responded to by the random access response.

27. An apparatus for wireless communication, comprising:
at least one processor configured to receive at least one random access (RA) preamble from at least one user equipment (UE) for random access, and to transmit a random access response including a first part and a second part, the first part including a list of N RA preamble identifiers (IDs) for N RA preambles being responded to by the random access response, and the second part including N individual RA responses for the N RA preambles, where N is a value of one or greater, wherein the first part includes N entries, each entry including an extension (E) field and an RA preamble ID field, the extension field being set to a first value to indicate another entry will follow in the first part or a second value to indicate no other entry will follow in the first part, and the RA preamble ID field carrying an RA preamble ID of an RA preamble being responded to by the random access response, wherein the first part includes a header and the second part includes a payload.

28. The apparatus of claim 27, wherein the at least one processor is configured to generate a Medium Access Control (MAC) protocol data unit (PDU) including a MAC header and a MAC payload, to map the first part of the random access response to the MAC header, and to map the second part of the random access response to the MAC payload.

29. The apparatus of claim 27, wherein the at least one processor is configured to generate a Medium Access Control (MAC) protocol data unit (PDU) including a MAC header and a MAC payload, to set a designated field of the MAC header to a predefined value to indicate the MAC PDU carrying the random access response, and to map the first and second parts of the random access response to the MAC payload.

30. A computer program product, comprising:
a non-transitory computer-readable medium comprising:
code for causing at least one computer to receive at least one random access (RA) preamble from at least one user equipment (UE) for random access; and
code for causing the at least one computer to transmit a random access response including a first part and a second part, the first part including a list of N RA preamble identifiers (IDs) for N RA preambles being responded to by the random access response, and the second part including N individual RA responses for the N RA preambles, where N is a value of one or greater, wherein the first part includes N entries, each entry including an extension (E) field and an RA preamble ID field, the extension field being set to a first value to indicate another entry will follow in the first part or a second value to indicate no other entry will follow in the first part, and the RA preamble ID field carrying an RA preamble ID of an RA preamble being responded to by the random access response, wherein the first part includes a header and the second part includes a payload.

31. The computer program product of claim 30, wherein the second part includes the N individual RA responses arranged in same order as the N RA preamble IDs in the first part, and wherein each individual RA response has a fixed size and includes one of a timing advance, an uplink grant, and a temporary Cell Radio Network Temporary Identifier (C-RNTI) for one UE.

* * * * *